United States Patent [19]

Ferguson

[11] Patent Number: 4,689,024
[45] Date of Patent: Aug. 25, 1987

[54] FRICTION DEVICE FOR DAMPING OSCILLATION OF AN OUTBOARD MOTOR

[75] Inventor: Arthur R. Ferguson, Northbrook, Ill.

[73] Assignee: Outboard Marine Corporation, Waukegan, Ill.

[21] Appl. No.: 752,143

[22] Filed: Jul. 3, 1985

Related U.S. Application Data

[63] Continuation-in-part of Ser. No. 614,815, May 29, 1984, Pat. No. 4,592,732, which is a continuation-in-part of Ser. No. 605,141, Apr. 30, 1984, Pat. No. 4,545,770, which is a continuation of Ser. No. 293,324, Aug. 17, 1981, Pat. No. 4,449,945.

[51] Int. Cl.⁴ .................................... B63H 21/30
[52] U.S. Cl. .............................. 440/52; 440/55; 188/83; 464/180
[58] Field of Search ............. 440/52, 53, 55, 900; 188/83, 74; 74/531, 495; 464/180

[56] References Cited

U.S. PATENT DOCUMENTS

| | | |
|---|---|---|
| 1,078,560 | 11/1913 | Shearer ........................ 464/180 X |
| 2,127,744 | 8/1938 | Linthwaite ........................ 440/52 |
| 2,182,596 | 12/1939 | Olsen ........................ 74/495 |
| 2,240,091 | 4/1941 | Cerne . |
| 2,549,481 | 4/1951 | Kiekhaefer . |
| 2,549,486 | 4/1951 | Kiekhaefer . |
| 2,816,455 | 12/1957 | Hammond . |
| 3,554,327 | 1/1971 | Takamura ........................ 188/83 X |
| 3,666,056 | 5/1972 | Hahn . |
| 3,774,571 | 11/1973 | Shimanckas ........................ 440/55 |
| 3,819,014 | 6/1974 | Mortnsen . |
| 3,902,575 | 9/1975 | Nelson et al. ........................ 188/83 X |
| 3,961,595 | 6/1976 | Meyer ........................ 440/52 |
| 3,966,023 | 6/1976 | Huang . |
| 4,016,962 | 4/1977 | Black . |
| 4,521,201 | 6/1985 | Watanabe ........................ 440/55 |

Primary Examiner—Joseph F. Peters, Jr.
Assistant Examiner—Paul E. Salmon
Attorney, Agent, or Firm—Michael, Best & Friedrich

[57] ABSTRACT

An outboard motor comprising a mounting assembly adapted to be fixedly attached to the transom of a boat and including a cylindrical bore defining a steering axis, a propulsion unit including a rotatably mounted propeller, a power head drivingly connected to the propeller, and a steering arm shaft pivotally received in the bore in the mounting assembly for pivotal movement of the propulsion unit relative to the mounting assembly and to the transom about the steering axis, and a friction device mounted on the mounting assembly and frictionally engaging the steering arm shaft for damping oscillation of the steering arm shaft about the steering axis relative to the mounting assembly.

1 Claim, 3 Drawing Figures

FRICTION DEVICE FOR DAMPING OSCILLATION OF AN OUTBOARD MOTOR

RELATED APPLICATION

This application is a continuation-in-part of application Ser. No. 614,815, filed May 29, 1984, now U.S. Pat. No. 4,592,732, issued June 3, 1986, which is a continuation-in-part of application Ser. No. 605,141, filed Apr. 30, 1984, now U.S. Pat. No. 4,545,770 issued Oct. 8, 1985 which is a continuation of application Ser. No. 293,324, filed Aug. 17, 1981, now U.S. Pat. No. 4,449,945, issued May 22, 1984.

BACKGROUND OF THE INVENTION

The invention relates to means for mounting an outboard motor on the transom of a boat for pivotal steering movement of the outboard motor propulsion unit relative to the transom, and more particularly to such means used in connection with power steering systems.

Some outboard motor power steering systems can cause oscillation of the outboard motor propulsion unit about the steering axis in response to starting of the outboard motor. The oscillation may continue until a damping load is placed on the propulsion unit to stop the oscillation.

It is known to use friction means for impeding rotation of an outboard motor propulsion unit about its steering axis. For example, see U.S. Kiekhaefer Pat. Nos. 2,549,481 and 2,549,486, both issued Apr. 17, 1951.

Attention is also directed to the following U.S. patents:

| Cerne | 2,240,091 | April 29, 1984 |
|---|---|---|
| Hammond | 2,816,455 | December 17, 1957 |
| Hahn | 3,666,056 | May 30, 1972 |
| Mortensen | 3,891,014 | June 25, 1974 |
| Huang | 3,966,023 | June 29, 1976 |
| Black | 4,016,962 | April 12, 1977 |

SUMMARY OF THE INVENTION

The invention provides an outboard motor comprising a mounting assembly adapted to be fixedly attached to the transom of a boat and including means including a cylindrical bore defining a steering axis, a propulsion unit including a rotatably mounted propeller, a power head drivingly connected to the propeller, and a steering arm shaft pivotally received in the bore in the mounting assembly for pivotal movement of the propulsion unit relative to the mounting assembly and to the transom about the steering axis, and friction means mounted on the mounting assembly and frictionally engaging the steering arm shaft for damping oscillation of the steering arm shaft about the steering axis relative to the mounting assembly.

In one embodiment, the friction means includes a friction pad engaging the steering arm shaft, and spring means biasing the friction pad into engagement with the steering arm shaft.

In one embodiment, the friction means is removable from the mounting assembly.

In one embodiment, the bore is generally vertical, the mounting assembly includes a generally horizontal, cylindrical bore having a first end communicating with the vertical bore, and an opposite second end, and the friction means includes a plug removably secured in the second end of the horizontal bore, a friction pad removably and slidably received in the first end of the horizontal bore and frictionally engaging the steering arm shaft, and a spring positioned between tne plug and the friction pad and biasing the friction pad into engagement with the steering arm shaft.

In one embodiment, the mounting assembly includes a transom bracket adapted to be fixedly attached to the transom, and a swivel bracket including the vertical bore and being pivotally connected to the transom bracket for pivotal movement of the swivel bracket relative to the transom bracket about a generally horizontal tilt axis, and the friction means is on the swivel bracket.

The invention also provides an outboard motor comprising a transom bracket adapted to be fixedly attached to the transom of a boat, a swivel bracket pivotally connected to the transom bracket for pivotal movement of the swivel bracket relative to the transom bracket about a generally horizontal tilt axis, the swivel bracket including a generally vertical, cylindrical bore, and a generally horizontal, cylindrical bore having a first end communicating with the vertical bore, and an opposite second end, a propulsion unit including a rotatably mounted propeller, a power head drivingly connected to the propeller, and a generally vertical steering arm shaft pivotally received in the vertical bore for pivotal movement of the propulsion unit relative to the swivel bracket and to the transom about a generally vertical steering axis, a plug removably secured in the second end of the horizontal bore, a friction pad received in the first end of the horizontal bore and frictionally engaging the steering arm shaft, and a spring positioned between the plug and the friction pad and biasing the friction pad into engagement with the steering arm shaft for damping oscillation of the steering arm shaft relative to the swivel bracket about the steering axis.

The invention also provides an outboard motor comprising a mounting assembly adapted to be fixedly attached to the transom of a boat and including means including a cylindrical bore defining a steering axis, a propulsion unit including a power assembly comprising a power head and a drive shaft housing including a rotatably mounted propeller driven by the power head, and a king pin having top and bottom ends connected to the power assembly and a central portion extending through the cylindrical bore for pivotal movement of the propulsion unit relative to the mounting assembly and to the transom about the steering axis, and friction means mounted on the mounting assemoly and frictionally engaging the central portion of the king pin for damping oscillation of the king pin about the steering axis relative to the mounting assembly.

A principal feature of the invention is the provision of an outboard motor comprising, in part, friction means mounted on the mounting assembly and frictionally engaging the steering arm shaft or king pin for damping oscillation of the steering arm shaft about the steering axis relative to the mounting assembly. Thus, the invention provides a simple means for preventing oscillation of the propulsion unit about the steering axis.

Other features and advantages of the invention will become apparent to those skilled in the art upon review of the following detailed description, claims, and drawings.

Figure 1:
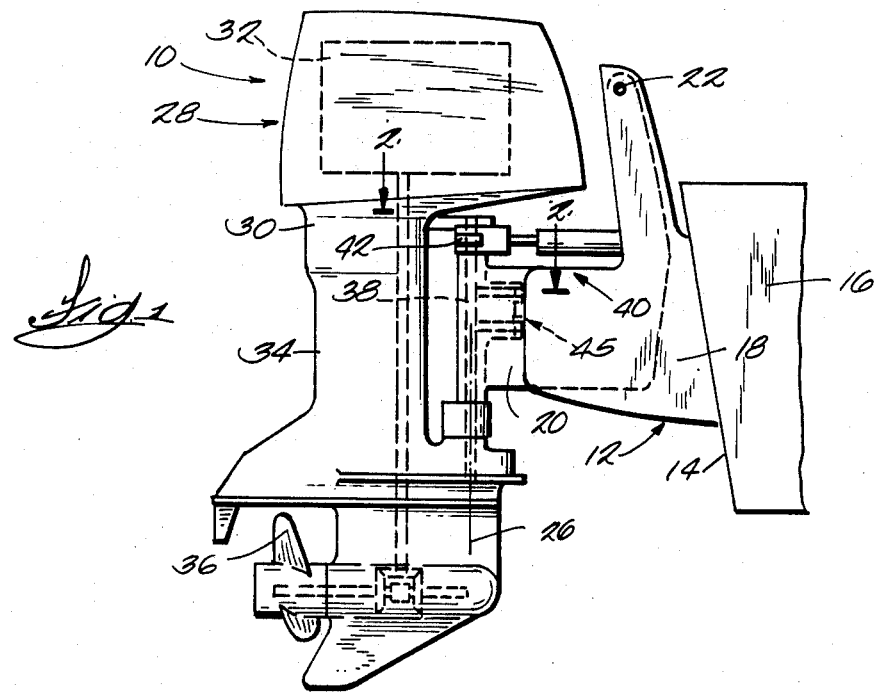
FIG. 1 is a side elevational view, partially in cross-section, of an outboard motor embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 2:
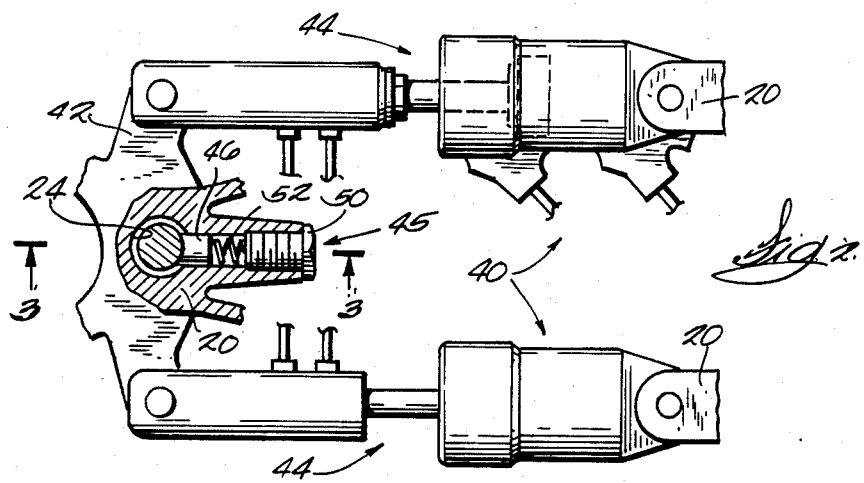
FIG. 2 is a cross-sectional view taken along line 2—2 in FIG. 1.

An outboard motor 10 embodying the invention is illustrated in the drawings. As best shown in FIG. 1, the outboard motor 10 comprises a mounting assembly 12 fixedly attached to the transom 14 of a boat 16. In the preferred embodiment, the mounting assembly 12 includes a transom bracket 18 fixedly attached to the transom 14, and a swivel bracket 20 pivotally connected to the transom bracket 18 for pivotal movement of the swivel bracket 20 relative to the transom bracket 18 about a generally horizontal tilt axis 22. The swivel bracket 20 includes (see FIGS. 2 and 3) means including a generally vertical cylindrical bore 24 defining a steering axis 26. It should be understood that in alternative emoodiments of the invention the cylindrical bore 24 defining the steering axis 26 need not be vertical.

The outboard motor 10 further comprises a propulsion unit 28 including a power assembly 30 comprising a power head 32, and a drive shaft housing 34 including a rotatably mounted propeller 36 driven by the power head 32. The propulsion unit 28 further includes a king pin or steering arm shaft 38 having top and bottom ends connected to the power assembly 30, and a central portion extending through or received in the cylindrical bore 24 in the swivel bracket 20 for pivotal movement of the propulsion unit 28 relative to the swivel bracket 20 and to the transom 14 about the steering axis 26.

The outboard motor 10 further comprises a power steering system 40 connected between the swivel bracket 20 and the propulsion unit 28 for causing pivotal steering movement of the propulsion unit 28 relative to the swivel bracket 20 about the steering axis 26. While any suitable power steering arrangement can be employed, in the preferred embodiment, the propulsion unit 28 further includes a steering arm 42 fixedly attached to the steering arm shaft 38 adjacent its upper end, and the power steering system 40 includes a pair of hydraulic assemblies 44 connected between the opposite ends of the steering arm 42 and the swivel bracket 20. An example of such a power steering system is disclosed in U.S. Ferguson patent application Ser. No. 614,815, filed May 29, 1984.

The outboard motor 10 further comprises friction means 45 mounted on the mounting assembly 12 and frictionally engaging the steering arm shaft or king pin 38 for damping oscillation of the steering arm shaft 38 about the steering axis 26 relative to the mounting assembly 12. In the preferred embodiment, the friction means 45 is removably mounted on the swivel bracket 20 and engages the central portion of the steering arm shaft 38.

While various suitable friction means 45 can be employed, in the illustrated construction, the friction means 45 includes a friction pad 46 engaging the steering arm shaft 38, and spring means biasing the friction pad 46 into engagement with the steering arm shaft 38.

Figure 3:
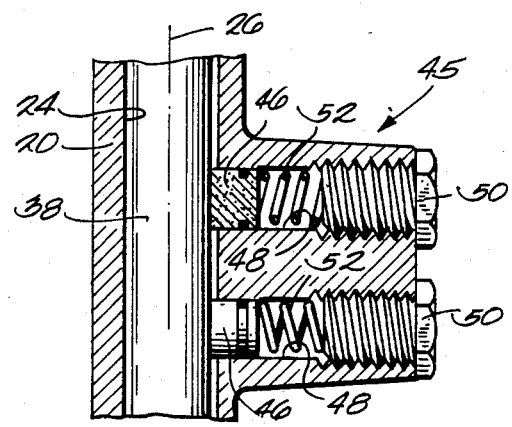
FIG. 3 is a view taken along line 3—3 in FIG. 2 and shown partially in cross-section.

More particularly, in the preferred embodiment, as best shown in FIG. 3, the swivel bracket 20 includes a pair of generally horizontal, cylindrical bores 48 each having a first or left end communicating with the vertical bore 24, and an opposite second or right end, and the friction means includes, in each of the horizontal bores 48, a plug 50 removably secured in the right end of the horizontal bore 48, a friction pad 46 removably and slidably received in the left end of the horizontal bore 48 and frictionally engaging the steering arm shaft 38, and a spring 52 positioned between the plug 50 and the friction pad 46 and biasing the friction pad 46 into engagement with the steering arm shaft 38.

When the motor is started, the friction means damps oscillation of the steering arm shaft 38 and thus of the propulsion unit 28 about the steering axis 26. If the friction pad 46 is worn due to rubbing the steering arm shaft 38, the spring 52 automatically compensates by expanding slightly.

Various other features and advantages of the invention are set forth in the following claims.

I claim:

1. An outboard motor comprising a transom bracket adapted to be fixedly attached to the transom of a boat, a swivel bracket pivotally connected to said transom bracket for pivotal movement of said swivel bracket relative to said transom bracket about a generally horizontal tilt axis, said swivel bracket including a generally vertical, cylindrical bore, and a generally horizontal, cylindrical bore having a first end communicating with said vertical bore, and an opposite second end, a propulsion unit including a drive shaft housing including a rotatably mounted propeller, a power head mounted on said drive shaft housing and drivingly connected to said propeller, and a generally vertical steering arm shaft located forwardly of said drive shaft housing and pivotally received in said vertical bore for pivotal movement of said propulsion unit relative to said swivel bracket and to the transom about a generally vertical steering axis and including a generally cylindrical outer surface, a plug removably secured in said second end of said horizontal bore, a friction pad received in said first end of said horizontal bore and including a surface which generally conforms to said cylindrical outer surface of said steering arm shaft and which frictionally engages said steering arm shaft, and a spring positioned between said plug and said friction pad and biasing said friction pad into engagement with said steering arm shaft for damping oscillation of said steering arm shaft relative to said swivel bracket about said steering axis.

* * * * *